United States Patent [19]
DeLano et al.

[11] 3,951,358
[45] Apr. 20, 1976

[54] GUIDANCE AND CONTROL SYSTEM FOR TARGET-SEEKING DEVICES

[75] Inventors: Richard H. DeLano; Raymond H. Griest, both of Los Angeles; Dean E. Wooldridge, Sherman Oaks, all of Calif.

[73] Assignee: Hughes Aircraft Company, Culver City, Calif.

[22] Filed: Dec. 5, 1952

[21] Appl. No.: 324,258

[52] U.S. Cl. .............................. 244/3.15; 244/3.16; 244/3.19; 244/3.20
[51] Int. Cl.² ...................... F41G 7/00; F42B 15/02
[58] Field of Search .................. 244/14, 14.2, 14.3, 244/3.15, 3.16, 3.19, 3.20; 250/33.651, 202, 203

[56] References Cited
UNITED STATES PATENTS

| | | | |
|---|---|---|---|
| 2,463,119 | 3/1949 | Pyle | 244/14 |
| 2,557,401 | 6/1951 | Agins | 244/14 |
| 2,588,382 | 3/1952 | Hammond | 244/14 |
| 2,638,585 | 5/1953 | Priest | 244/14 |

*Primary Examiner*—Malcolm F. Hubler
*Attorney, Agent, or Firm*—James K. Haskell; Noel B. Hammond

EXEMPLARY CLAIM

5. In a target-seeking device having a plurality of steering members for steering it along a predetermined type of navigation course with respect to a target that is illuminated by radio-frequency signals having a substantially constant repetition rate, a guidance and control system operable solely in response to echoes of said signals reflected from said target for effecting the steering of said device along said predetermined course, said system comprising, in combination, gyroscope scanning means for conically scanning an area wherein said target is located; means coupled to said scanning means for receiving said signals, means for operating said receiving means in synchronism with the received echo signals, said scanning means being a generator of reference signals; means selectively operable by said reference signals and coupled to said receiving means to produce error signals representative of the deviation of said target from the center of the field of scan; and means selectively operable in response to said error signals and coupled to said scanning means and to said steering members to effect continuous tracking of said target by said scanning means and to operate said steering elements for steering said device along said predetermined course.

10 Claims, 12 Drawing Figures

INVENTOR.
RICHARD H. DELANO,
RAYMOND H. GRIEST,
BY DEAN E. WOOLDRIDGE,

Nicholas T Volm
their ATTORNEY.

INVENTOR.
RICHARD H. DELANO,
RAYMOND H. GRIEST,
BY DEAN E. WOOLDRIDGE,

Nicholas T Vohn
their ATTORNEY.

FIG. 6.

GUIDANCE AND CONTROL SYSTEM FOR TARGET-SEEKING DEVICES

This invention relates to systems and methods for controlling target seeking devices, and more particularly to a guidance and control system for accurately steering a target seeking or homing device of the self-propelled type, such as a guided missile and the like, along a predetermined course with respect to a desired moving target.

Guidance and control systems for target seeking devices such as missiles are integral parts of missile fire control systems and are employed to effect the steering of missiles in flight. The chief objective of such a guidance and control system is to utilize information derived from signals received from or reflected by a target for the purpose of maintaining a missile on a collision course with respect to the target, which may be moving at great speed and in an evasive path. To date, two main types of guidance and control systems for guided missiles have been employed, namely, the so-called "active" missile control type, and the "semiactive" missile control system. Both types of guidance and control systems operate in response to microwave energy pulses which "illuminate" a target from a radar transmitter antenna tracking the target. The active missile control system is characterized by the fact that the radar transmitter is carried by the missile; the semiactive missile control type is characterized by the fact that the transmitter is not incorporated in the missile but is separate therefrom, usually located at the missile launching station. The missile launching station may be a ground radar station if the missile is designed for ground-to-air operation, or it may be a launching or "mother" aircraft if the missile is designed as an air-to-air or air-to-ground weapon. The active missile guidance and control system is employed where space requirements in the missile do not constitute an all-important factor, and the semiactive missile control system is used where space and weight restrictions prevents inclusion of additional equipment, such as a radar transmitter, in the missile.

In order to provide guided missiles which may have the widest possible use as tactical weapons, there has been a trend toward the semiactive type missile which can be made sufficiently small to be carried in fairly large numbers by relatively small fighter or interceptor aircraft.

At the launching station and prior to launching, control circuits coordinating the radar and the missile guidance and control systems align the missile along a predetermined collision course with respect to the target. The missile is launched after it is so aligned and when the target is within range of the missile. The radar transmitter antenna provided at the launching station illuminates both the target and the missile with microwave energy. The conventional guidance and control system therefore depends for its proper functioning upon essentially two sets of external signals, namely, one set being the echo signals reflected from the moving target and picked up by a target scanning antenna in the nose of the missile, and the other set being signals picked up directly by a separate antenna provided in the missile which faces rearward toward the signal source or launching station.

The signals received directly from the transmitter at the launching station are employed as synchronizing or reference signals to "gate" a receiver to which the echo signals are applied. Because of the possibility that noise generated locally in the receiver circuit or extraneous noise signals may make the receiver insensitive to the desired echo signal, these synchronizing signals are employed to gate the receiver in synchronism with the received echo pulses in order to reduce to a minimum the effect of this interference. When the receiver is so gated, the guidance and control system functions properly to effect the operation of missile control surfaces for steering the missile along the desired course.

The synchronizing signals developed by the transmitter are also utilized to effect range-tracking by the guidance and control system. As the distance between the missile and its target decreases, the phase of the target echo signals changes. Therefore, the phase of the gating signal must be changed in corresponding manner in order to insure the proper operation of the receiver and to minimize noise.

One form of the semiactive guided missile as presently known requires a roll-stabilization system to substantially prevent rolling of the missile to insure the optimum functioning of the rearward facing antenna for continuous reception of the synchronizing signals; in the absence of roll-stabilization, rolling of the missile as it maneuvers would tend to move the antenna therewith so as to prevent the desired reception of the synchronizing signals.

The chief disadvantages of the guidance and control system of the type above described for semiactive missiles are the inherent complexity and its dependence throughout the flight of the missile upon the controlling radar transmitter at the launching station for providing the required synchronizing signals.

Elimination of the requirement of receiving synchronizing signals directly from the controlling radar transmitter would eliminate the necessity of providing a separate missile antenna for receiving such synchronizing signals. Hence, if the guidance and control system can be self synchronized to operate solely upon the echo signals received from the target, the system is much less vulnerable to interference from other transmitters or to countermeasures.

Furthermore, elimination of the need for completely roll-stabilizing the missile would provide two advantages: it would permit the elimination of relatively expensive roll-stabilizing units heretofore required, and it would result in a still further saving of space. Missiles having no need for such equipment could be made sufficiently small and light to be carried in quantity by a single small aircraft.

This invention discloses a guidance and control system for semiactive guided missiles which is inherently simpler than the guidance and control systems of the prior art and which is sufficiently accurate to effect contact of the missile with the moving target.

In one embodiment of the disclosed system, there is employed an antenna and reflector for receiving circularly polarized waves. The reflector forms or is integral with the rotor of a free gyro and is adapted for conically scanning a target. Echo signals returned from the target and picked up by the antenna become amplitude-modulated, due to the field intensity pattern of the antenna, to a degree depending upon the displacement of the target from the antenna scan axis, that is, the spin axis of the reflector, which is the line of sight from the missile to the target. In addition to the rotating reflector, the gyro rotor or wheel is also provided with means for generating reference signal pulses, by means of which an error detecting channel or network is operated to compare the relative magnitudes and phases of the modulated echo signals for a particular target displacement.

The error detecting channel comprises electronic switching circuits which are selectively operable or gated by the reference signal pulses. Each switching circuit develops an output signal in accordance with the amplitude of the modulated echo signal which such switching circuit "sees" at the instant it is rendered operative. The output signals of selected pairs of switching circuits are combined to provide error or steering signals which are representative respectively of the horizontal and vertical deviation of the target from the line of sight. As long as the target remains within the center of the scan axis, no signals will appear in the output of the error detecting channel; however, a target will generally tend to be displaced from the scan axis by virtue of initial launching errors and also evasive movements of the target or vibrational motions of the missile in flight. The output signals of the error detecting channel are employed to control the operation of missile control surfaces in accordance with the steering signals, and also to effect precessional movement of the gyro forming the reflector so that the antenna will tend to line up with or track the target.

Maximum effectiveness of the system is realized by provision of roll rate controls which, although allowing the missile to roll, limit the roll rate to a maximum value dependent on the time constant of the guidance and control system for the purpose of enabling error signals to effect the proper operation of the correct missile control surfaces before the missile has rolled through too large an angle.

To insure the operation of the system with a minimum amount of interference from extraneous interference signals, a target or range tracking network is provided which gates the system in synchronism with the arrival of the echo signals. Furthermore, an accurate "time-gating" circuit is provided in the target-tracking network for providing maximum sensitivity of the system to echo signals, from the time the missile is launched until it approaches the point of collision with the target.

Radiant energy received from a target may also comprise infrared radiations produced by the target itself, rather than electromagnetic signal pulses as utilized in the first embodiment of the invention. The infrared radiations are utilized in a second embodiment of this invention, which includes a scanning optical system used for receiving infrared radiations. An interrupting mechanism is interposed between the optical system and a photoelectric device, the latter converting the received energy into electrical signal pulses. The scannning optical system is also utilized to generate reference signals in the manner of the antenna reflector above described. The converted signal pulses, which represent the deviation of the target from the axis of the optical system, are applied to a receiver where they are amplified and detected. An error detecting channel, similar to that used with the echo pulses in the manner above described, is coupled to the receiver and operates upon occurrence of the reference signals generated by the optical system to develop steering signals in the same manner as when the target is periodically illuminated by the electromagnetic energy pulses.

It is, therefore, one of the objects of this invention to provide a guidance and control method and system for target-seeking devices in which such devices are steered in response only to radiant energy received from a target.

It is another object of this invention to provide a missile guidance and control system for a missile in which scanning means for receiving radiant energy from a moving target is part of a gyro unit, the rotational axis of which provides a reference point of the system and thus makes the operation of the system substantially independent of missile roll, and in which such reflector is employed to generate reference signals for permitting phase detection of radiant energy received from a target to enable the guidance and control system to properly steer the missile along a desired course with respect to the target.

It is an additional object of this invention to provide a missile guidance and control system in which radiant energy from a moving target constitutes the only energy received from space necessary for proper operation of the system to steer a missile.

It is a further object of this invention to provide a semi-active missile type guidance and control system in which a microwave antenna reflector is employed for scanning a signal-illuminated target and for receiving echo signals therefrom, such reflector being part of a gyro unit and being employed for generating reference signal pulses at the scanning frequency thereof, in which phase-detecting means is rendered operable when the occurrence of the reference signal pulses to develop steering signals representative of the position of the target within the field of scan of the reflector, and in which steering elements for the missile are operated in accordance with such steering signals to properly steer the missile along a desired course with respect to the target.

Still another object of this invention is to provide a missile guidance and control system for use in tracking a target that produces infrared radiations, wherein a scanning optical system forming part of a gyro unit is adapted to receive infrared radiations produced by the target, the scanning optical system being employed to generate reference signal pulses of the scanning frequency of the optical system, in which means associated with the optical system are employed for converting the infrared radiations into electric signal pulses, in which phase-detecting means for receiving the electric signal pulses is operable upon the occurrence of the reference signal pulses to develop steering signals representative of the position of the target with respect to the axis of the optical system, and in which steering elements for the missile are operated in response to the steering signals to properly steer the missile along a predetermined course with respect to the target.

The novel features which are believed to be characteristic of the invention, both as to its organization and method of operation, together with further objects and advantages thereof, will be better understood from the following description considered in connection with the accompanying drawings, in which different embodiments of the invention are illustrated by way of example, and its scope is pointed out in the appended claims.

Figures 1, 2:
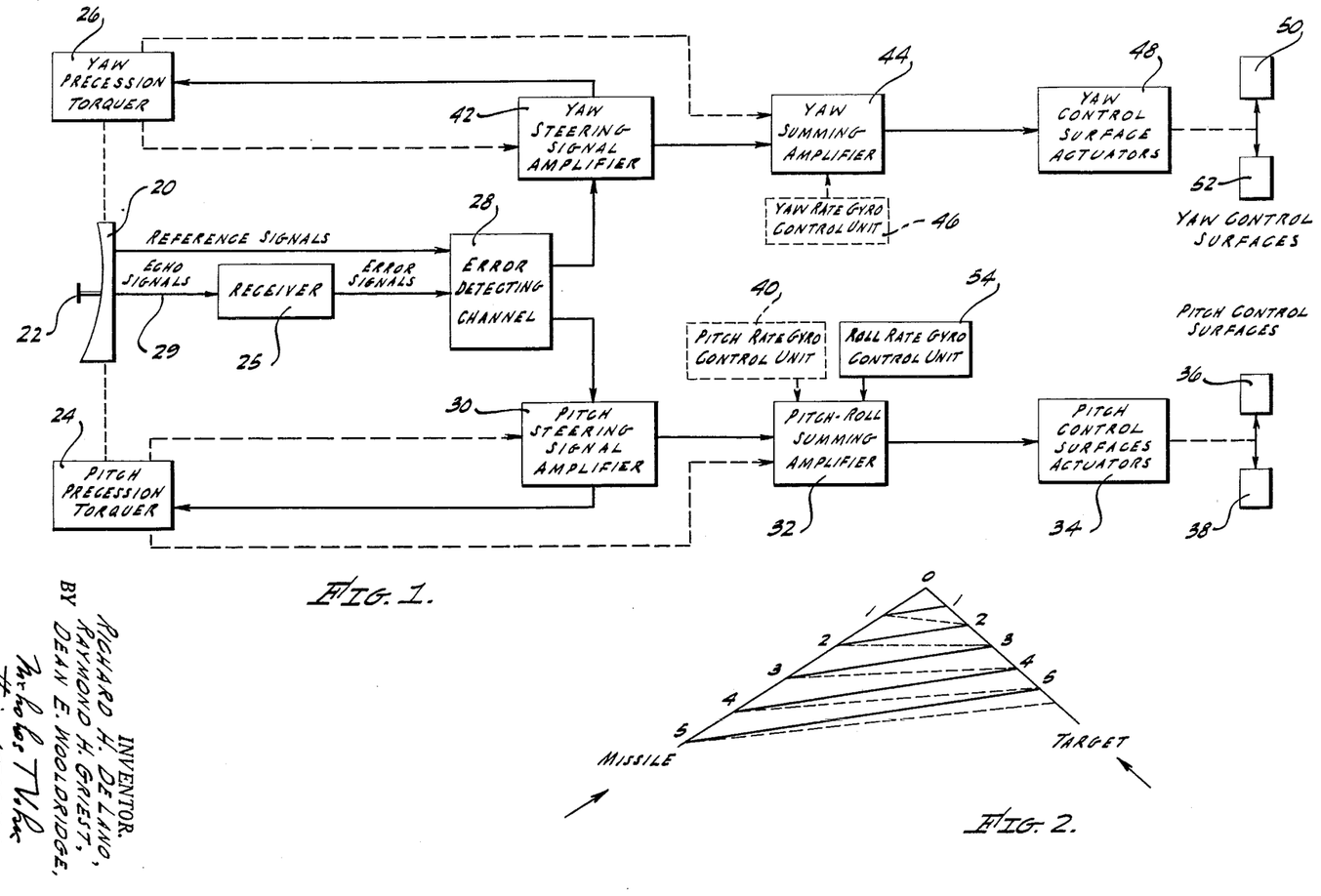
FIG. 1 is a block diagram showing the essential parts of a guidance and control system embodying the invention and operable in response only to echo signals received from a target to steer a target-seeking device in accordance with a predetermined type of navigation system with respect to the target.
FIG. 2 is a plot of a target and target-seeking device or missile flying along unaccelerated trajectories, to illustrate the position of the line of sight from the missile to the target.

Referring to the drawings, in which like reference characters indicate like parts throughout, and more particularly to FIG. 1, the guidance and control system of the invention for a target-seeking device, such as a self-propelled missile or the like, operates in response to echo signals reflected from a target that has been illuminated by microwave energy pulses radiated toward such target from a radar transmitting antenna. The echo signals are received or intercepted by means of an antenna-reflector combination which scans a conical field within which the target is located.

In accordance with well known principles of antenna design, a receiving antenna of the type above mentioned preferably employs a suitable antenna reflector, as for example a parabolic reflector 20, which is rotated or spun about its axis as indicated in such a manner that signals within a conically described region will be impressed upon a suitable antenna, such as an antenna 22 located on the spin axis of the reflector 20 and adapted to receive circularly polarized waves. As is well known, signals returned from a target within such an area become amplitude-modulated, due to the antenna field intensity pattern, at the particular scanning rate corresponding to the number of revolutions of the reflector 20 and to a degree depending upon the displacement of the target from the reflector spin axis, that is, from the antenna scan axis which represents the line of sight from the missile to the target. It is to be understood that the present invention is directed to a guidance and control system which functions to control the steering of a missile during its flight. Before the missile is launched from its launching station, the guidance and control system will of course have been conditioned or adjusted for optimum operation, with the antenna 22 and the transmitting antenna of the launching station both being oriented in the same direction so as to "point" at the same target. The guidance and control system functions to vary the position of the antenna 22 as necessary to maintain the target substantially on the scan axis thereof, that is, on the line of sight, prior to launching of the missile and also during its flight; in addition, the system functions during the flight of the missile to steer the missile in accordance with a predetermined type of navigation with respect to the target.

As previously mentioned, mechanical devices for rotating the reflector 20 to achieve conical scanning are well known. However, in the present guidance and control system, the reflector 20 also forms or is integral with the rotor of a "free" gyro and therefore has the three degrees of freedom characteristic of free gyros, that is, with the spin axis of the rotor considered as one degree of freedom, about either of three mutually perpendicular axes in contrast to gyro rotors which are restrained against movement about more than one or two axes.

A parabolic reflector forming a gyro rotor obviously can be rotated for scanning at much higher speed or rates than is possible in prior art reflector arrangements. A scanning rate of 250 c.p.s. (cycles per second), for example, is easily obtainable with such a gyro rotor reflector. The gyro rotor reflector 20 preferably is centrally mounted in the nose of the missile on a suitable gimbal structure in a manner well known in the gyroscope art.

It is a characteristic of a freely rotating gyro antenna reflector of the type above described that it is relatively independent of any rotational movements or roll of the missile in which it is housed. An electromechanical system supplied with signals received by the antenna 22 thus has a reference point determined by the rotational axis of the reflector 20 and accordingly is also independent of the missile roll. The reflector 20 is mechanically linked to suitable precession means for the gyro, such as a pitch precession torquer 24 and a yaw precession torquer 26, which are suitable devices operable for effecting, respectively, vertical and horizontal movements of the reflector 20 and the antenna 22.

The rotating reflector 20 is further utilized to generate reference signals which are impressed upon an error detecting channel 28. Coincidentally, the amplitude-modulated echo signals obtained from the antenna 22 are applied through a suitable transmission line, shown schematically at 29, to a receiver 25 from which error signals are derived and impressed upon the error detecting channel 28. As will be more fully explained hereafter in connection with FIGS. 7–10, the reference signals effect switching or gating operations within the error detecting channel 28 for determining the relative amplitudes and phases of different portions of the amplitude-modulated error signals during predetermined instants. From the output of the error detecting channel 28 there are obtained steering signals necessary to precess the reflector 20 for the above-mentioned purpose and to effect the respective pitch and yaw movements of the missile necessary for steering the missile along the desired collision course with respect to the target.

The pitch control or pitch steering voltages from the error detecting channel 28 are applied to the input circuit of a pitch steering signal amplifier 30, the output of which is coupled, respectively, to the pitch precession torquer 24 and to a pitch summing amplifier 32. The output of the amplifier 32 is applied to electromechanical means, designated as control surface actuators 34, which are mechanically linked to middle pitch control or steering members, such as a pair of pitch control tail surfaces or elements 36 and 38. The pitch control surfaces 36, 38 are adapted for operation by the control actuators 34 in accordance with the output signal of the summing amplifier 32 to control the vertical movement of the missile.

If aerodynamic damping of the missile is insufficient to reduce oscillations in pitch induced by the operation of the pitch control surfaces, it may be desirable to provide additional damping by the electrical system, in which case there may also by coupled to the summing amplifier 32 the output signal of a pitch rate gyro control unit 40. The pitch rate gyro control unit 40 produces signals in a well known manner which are impressed upon the summing amplifier 32 where they are added to the steering signals in ratio appropriate for providing more stable operation of the control surfaces 36, 38.

For controlling both yaw precession of the reflector 20 and yaw movement of the missile, appropriate yaw steering voltages obtained from the output of the error detecting channel 28 are impressed upon a yaw steering signal amplifier 42, the output of which is coupled both to the yaw precession torquer 26 and to a yaw summing amplifier 44. As in the pitch control channel, the yaw summing amplifier 44 also may be coupled to the output of a yaw rate gyro control unit 46; similarly as in the pitch control channel, the yaw summing amplifier 44 controls the operation of control surface actuators 48 coupled to the output thereof for effecting the operation of a pair of yaw control tail surfaces 50 and 52 mechanically linked to the actuators 48.

As explained hereinbefore, output signals from the error detecting channel 28 are utilized to precess the reflector 22 and the antenna 20 so that the target is maintained in the field of scan and furthermore to steer the missile along a predetermined collision course with respect to the target.

Preferably, the pitch and yaw control surfaces 26, 38 and 50, 52 comprise two pairs of deflectable members arranged on mutually perpendicular axes about the missile; such axes provide a coordinate system for the missile. If the missile were allowed complete freedom of roll, it is possible that spinning of the missile, and consequently spinning of the coordinate axes, might be sufficiently rapid so that respective pitch and yaw steering signals derived from the error detecting channel 28 would effect incorrect operations of the pitch and yaw control surfaces. This can easily be seen if we assume a rate of roll for the missile that is relatively high compared to the time constant of the guidance and control system. In such a case, pitch steering signals applied to the pitch control actuators 34 for operation of the pitch control surfaces 36, 38 would reach such actuators at a later instant when the control surfaces have rotated far beyond the position they occupied when such pitch steering signals were developed, and, therefore, the pitch correction applied to the control surfaces 36, 38 would be entirely incorrect, and might even result in a change in the yaw movement of the missile. The situation is the same for the yaw steering signals.

Thus it can be seen that it is necessary to have some provision for controlling the rate at which the missile is permitted to roll. The degree of control necessary is that suggested by the above discussion, that is, rolling of the missile should be so limited that the system functions to furnish the proper correction voltages for operation of the control surfaces before such control surfaces have rotated so far as to render the control voltages substantially incorrect. To this end, a roll-rate gyro control unit 54 is employed to generate signals for application through the amplifier 32 to the pitch control surface actuators 34 for operating the pitch control surfaces 36, 38 differentially in a wall known manner to limit the rate of roll of the missile to a predetermined amount.

The use of gyro units to generate signals for limiting rotational movements of target-seeking devices is of course well known. However, a unique feature of the system of the invention is that complete roll-stabilization of a self-propelled missile is unnecessary in order trhat guidance and control system in accordance with the present invention be effective to accurately steer the missile. Within the limits of the roll-rate established by the single roll-rate gyro control unit 54, the system will function to effect the proper operation of the respective control surfaces. Furthermore, since only one roll-rate gyro control unit is required here, a considerable saving both in cost and space is realized over prior art systems, where substantially complete roll-stabilization was necessary and additional roll-stabilizing gyro units had to be employed.

The above described means for utilizing the output of error detecting channel 28, to precess the reflector 20 and to operate the control surfaces 36, 38 and 50, 52, represents a preferred arrangement for the use of precession torquers of the electromagnetic type. As is well known, electromagnetic torquers operate substantially linearly in response to control signals; however, such electromagnetic torquers inherently present a weight problem where weight requirements are of major consideration. Where it is desired to employ friction torquers for the precession torquers 24, 28 to realize a saving in weight, the above described means for utilizing the output of the error phase detector 28 may be modified to achieve the desired operation of the torquers 24, 26. In such cases, the steering signal amplifiers 30, 42 preferably would supply only the precession torquers 24, 26 directly as above described, while the precession torquers 24, 26 in turn apply steering signals to the input circuits of the summing amplifiers 32, 44. Furthermore, there would be provided, in a manner well known in the related art, servo loop or a feedback path from the precession torquers 24, 26 to the respective steering signal amplifiers 30, 42 to insure linear operation of the torquers in response to control signals applied thereto. The connections for thus supplying steering signals to the summing amplifiers 32, 44 from the respective precession torquers 24, 26 and for providing feedback paths from each precession torquer 24, 26 to its respective steering signal amplifier 30, 42 are shown in dotted lines in FIG. 1.

In self-propelled target-seeking devices which are designed to travel at supersonic speeds, such as rocket-powered missiles and the like, such factors as fuel consumption, acceleration imparted to the missile body due to maneuvering, and the effects of the noise on electronic circuits have considerable bearing on the choice of the navigation course along which it is desired that the guidance and control system steer the missile for assuring its collision with a target. The type of navigation system selected for the steering of a missile by the system of the present invention is the well known proportional navigation system, which is briefly described in connection with FIGS. 2, 3 and 3a to provide a better understanding of the invention.

FIG. 2 illustrates paths of a missile and target flying along unaccelerated trajectories which intersect at a point 0. Points spaced equally along each path indicate the positions of the missile and of the target at successive equal time intervals before collision, and straight full lines joining similarly numbered points along the two paths represent the line-of-sight from the missile to the target at each interval. In such a situation, the individual lines-of-sight are all parallel, that is, the direction of the line-of-sight is stationary or fixed in space; as is well known this means that a collision course for unaccelerated trajectories is one for which the direction of the line-of-sight remains fixed in space, and that a collision will not occur if the line-of-sight does not remain so fixed.

To determine how the line-of-sight behaves in the absence of collision, assume that the positions of the target are displaced one interval behind the collision positions above described; the straight dashed lines indicates the direction of the line-of-sight for this situation. It will be observed that the individual lines-of-sight no longer are parallel, that is, the direction of the line-of-sight is no longer fixed but rotates in a clockwise direction, and the missile will pass ahead of the target. In order that the missile does not miss the target and that a hit be achieved, the missile would have to turn toward the target in the same direction as the angular motion of the line-of-sight, that is, toward the right of FIG. 2. If the target passes ahead of the missile, the situation would of course be reversed. In this connection, the following description of FIGS. 3 and 3a serves to explain the required steering of the missile in order to effect collision of a target when the line-of-sight rotates.

Figure 3:
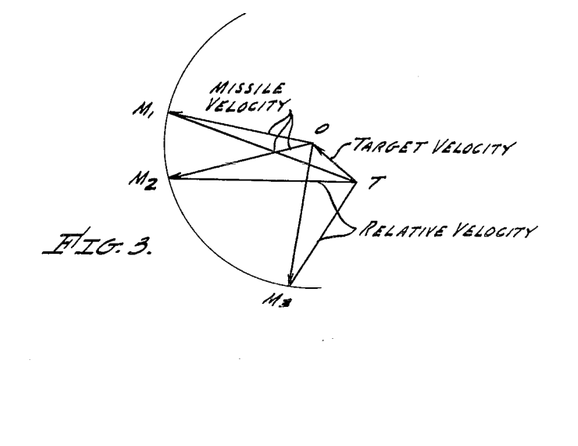
FIGS. 3 and 3a are vector diagrams illustrating the effect of different headings of a missile with respect to a target.

FIG. 3 illustrates the velocity vestor relationships for a missile launched or headed in different directions with respect to a target, T, for collision therewith at a point 0 in the manner referred to above in connection with FIG. 2. The missile may be headed along a collision course with a number of positions $M_1$, $M_2$, $M_3$. Under normal circumstances the velocity of a missile and particularly a missile traveling at great supersonic speeds, is greater than that of the target; accordingly a target will appear to move toward a missile that is traveling on a collision course with respect thereto. (Such apparent motion of the target, which has a velocity vector TO may be accounted for vectorially in a well known manner by presenting the missile velocity vectors $OM_1$, $OM_2$, $OM_3$ as indicated and determining the relative velocity $TM_1$, $TM_2$, $TM_3$ between the target and the missile by simple vector addition.

Figure 3A:
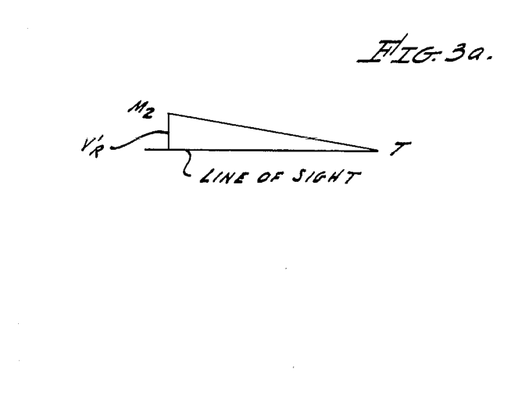

The target velocity vector TO represents the line-of-flight of the target, and the missile velocity vector, as, for instance, $OM_2$, is parallel to the line-of-flight of the missile, and the relative velocity vector $TM_2$ represents the line-of-sight. If, the line-of-sight and the relative velocity vector do not remain parallel, there is of course a component of relative velocity $V_R'$ that is perpendicular to the line-of-sight. (FIG. 3a). Furthermore, the component of relative velocity $V_R'$ will rotate at an angular rate that is equal to the ratio of the magnitude of this component $V_R'$ and the range R from the missile to the target. If this change in angular rotation is represented by $\dot\phi$, then $\dot\phi = V_R'/R$. Accordingly, it is clear that the geometrical criterion for setting up a collision course is that the relative velocity vector be parallel to the line-of-sight, that is, that the component of relative velocity $V_R'$ be eliminated; it is the function of the guidance and control system that this relationship be maintained. Given any direction for the line-of-sight, a heading of the missile for collision course can be determined for which the relative velocity vector is parallel to the line-of-sight.

In general, it is not possible to observe both the position and the velocity of the target with sufficient accuracy for a collision course to be achieved in a single step, but fortunately this is not necessary; it is sufficient merely to steer the missile so as to reduce the angular rate of the line-of-site as soon as it is detected in order that it be substantially zero when the missile approaches the target.

The essential difference between various guidance systems lies in the manner in which the steering is related to the angular motion of the target as observed from the missile. Possibly the simplest system would be a pursuit course, or straight homing upon the target, in which the missile velocity vector is maintained parallel to the line-of-sight, i.e., the missile aims directly toward the target, without lead or heading. The corresponding steering equation is $\dot\theta = \dot\phi$, or $\dot\theta/\dot\phi = 1$ where $\dot\theta$ is the missile velocity rate of turn. This system of course has great disadvantages in that a pursuit course may become a tail chase, which is wasteful of fuel; what is more important, angular rates of change of the line-of-sight observed at long ranges are so slight that little steering is called for until late in the run, when greater rates of turn are demanded of the missile than can be achieved by the guidance and control system, and misses result.

A more efficient navigation system is the above-mentioned proportional navigation system. The steering equation for this system is system is $\dot\theta = \tau\dot\phi$, where $\tau$ has a value different from unity and depends upon the response of the missile desired in accordance with the angular rate of turn of the line-of-sight. This has the effect of increasing the correction in missile heading early in the run which is necessary to follow a target on an evasive course, causing the missile to lead the target by an amount which quickly approaches a collision course. The effect is to equalize the steering throughout the run, and thus to avoid exceeding the capabilities of the guidance and control system in effecting the necessary rate of turn of the missile at the end of its course and thereby to reduce the likelihood of miss.

In general, an acceleration of the target or missile would be represented by a change in the length and direction of the appropriate vector, that is, change in speed as well as in direction.

While the above discussion has been based upon consideration of a target which does not accelerate, it is apparent that if, to an observer on the missile, the target appears to close directly upon him immediately before the flight ends, a hit must result even though the target maneuvers. This means that it must always be possible to set up a resultant velocity vector in any specified direction by manipulating only the missile velocity vector. This requires that the acceleration of the missile, or the change in the length and direction of the missile velocity vector, always be at least as great as that of the target, while to reduce the uncorrected error before the end of the flight, the compensating maneuver must be completed in a minimum of time; this of course requires that the performance of the missile with respect to acceleration exceed that of the target by the greatest possible margin. The means employed in the present system to insure the desired performance of a missile will now be described in more detail in connection with FIGS. 4 – 6.

Figure 4:
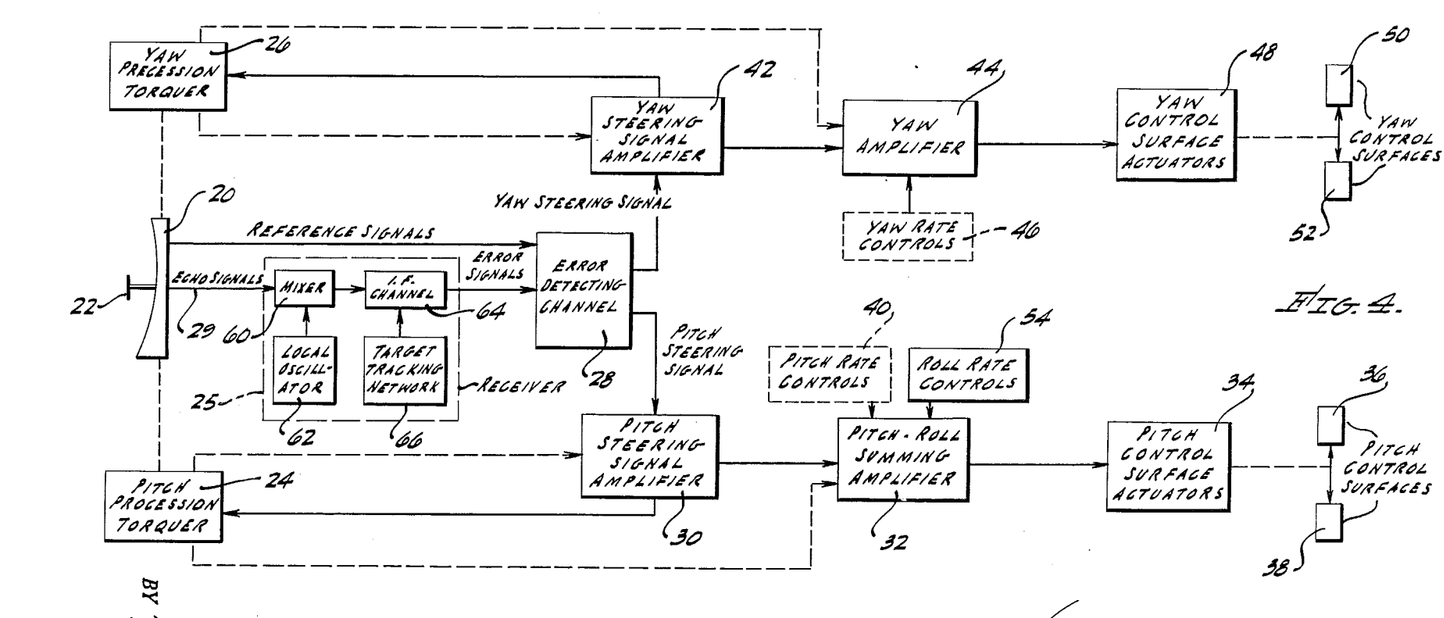
FIG. 4 is a block diagram showing in more detail certain portions of the system of FIG. 1.

FIGS. 4 illustrates certain basic circuits in block form comprised within the receiver 25 of the guidance and control system of FIG. 1. The modulated echo signal received by the antenna 22 is applied through the transmission line 29 to a mixer circuit 60, where it is mixed with the output wave developed by a local oscillator 62 to produce a predetermined intermediate frequency ($i - f$) signal; this $i - f$ signal is fed from the output of the mixer to an $i - f$ channel 64, where it is amplified and detected and then impressed upon the input of the error detecting channel 28.

In the system of the invention signals from the target-illuminating radar antenna are not employed as synchronizing signals. Instead, a target-tracking network 66 coupled to the $i - f$ channel 69 is employed to gate the output of the $i - f$ channel in synchronism with the received echo pulses. In a detailed discussion of the target-tracking network in connection with FIG. 6, it will be pointed out how such synchronization insures the operation of the system with a minimum of interference from extraneous signals, and, furthermore, how the target-tracking network 66 includes means for insuring maximum sensitivity of the system to echo signals returned from a selected target.

Figure 5:
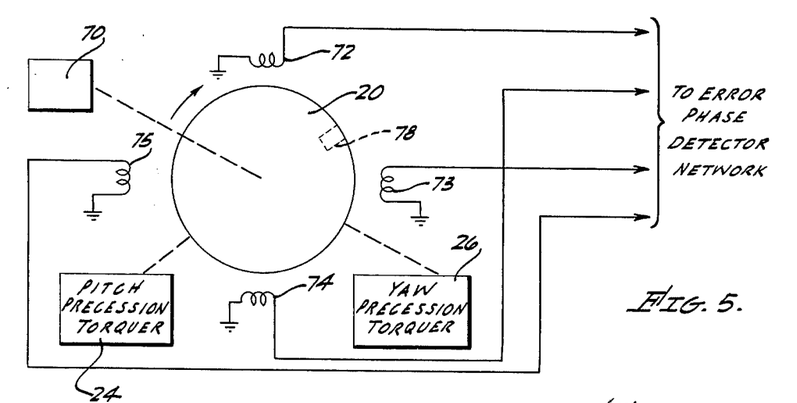
FIG. 5 is a schematic diagram showing the antenna reflector and associated circuits for generating local reference signals employed in the guidance and control system of FIG. 1.

For a more detailed description of the system shown in FIGS. 1 and 4 reference should be made thereto in connection with FIGS. 5–10. FIG. 5 shows a preferred arrangement for generating the reference signals previously mentioned in a manner described and claimed in a co-pending application of L. H. Weiss. "Indicating System and Method for Tracking Moving Objects", Ser. No. 332,785, filed Nov. 26, 1952, and assigned to the same assignee as the present application.

Referring to FIG. 5, the gyro rotor reflector 20 is shown mechanically linked to a suitable gyro motor 70 for establishing a desired rotation or scanning rate of the reflector 20, which, as indicated by an arrow, turns in the clockwise direction. Four inductors or coils 72, 73, 74, and 75 spaced around the periphery of the reflector 20 lie in the path of a small permanent magnet 78 that is imbedded in the reflector 20. One lead of each coil is connected to a common reference point, which may represent the housing of the missile, indicated as ground; the other lead of each coil is connected to an error phase detector network. As the magnet 78 sweeps past each coil, a reference signal pulse or "pip" voltage is induced therein and impressed on such error phase detector network. Thus the reference signal pulses represent the position of the magnet 78 and hence the reflector 20. The oppositely disposed pairs of coils 72, 74, and 73, are coupled to respective pairs of switching circuits comprising the phase detector, for controlling the operation thereof in a manner described hereafter in connection with FIGS. 7 – 10.

Figure 6:
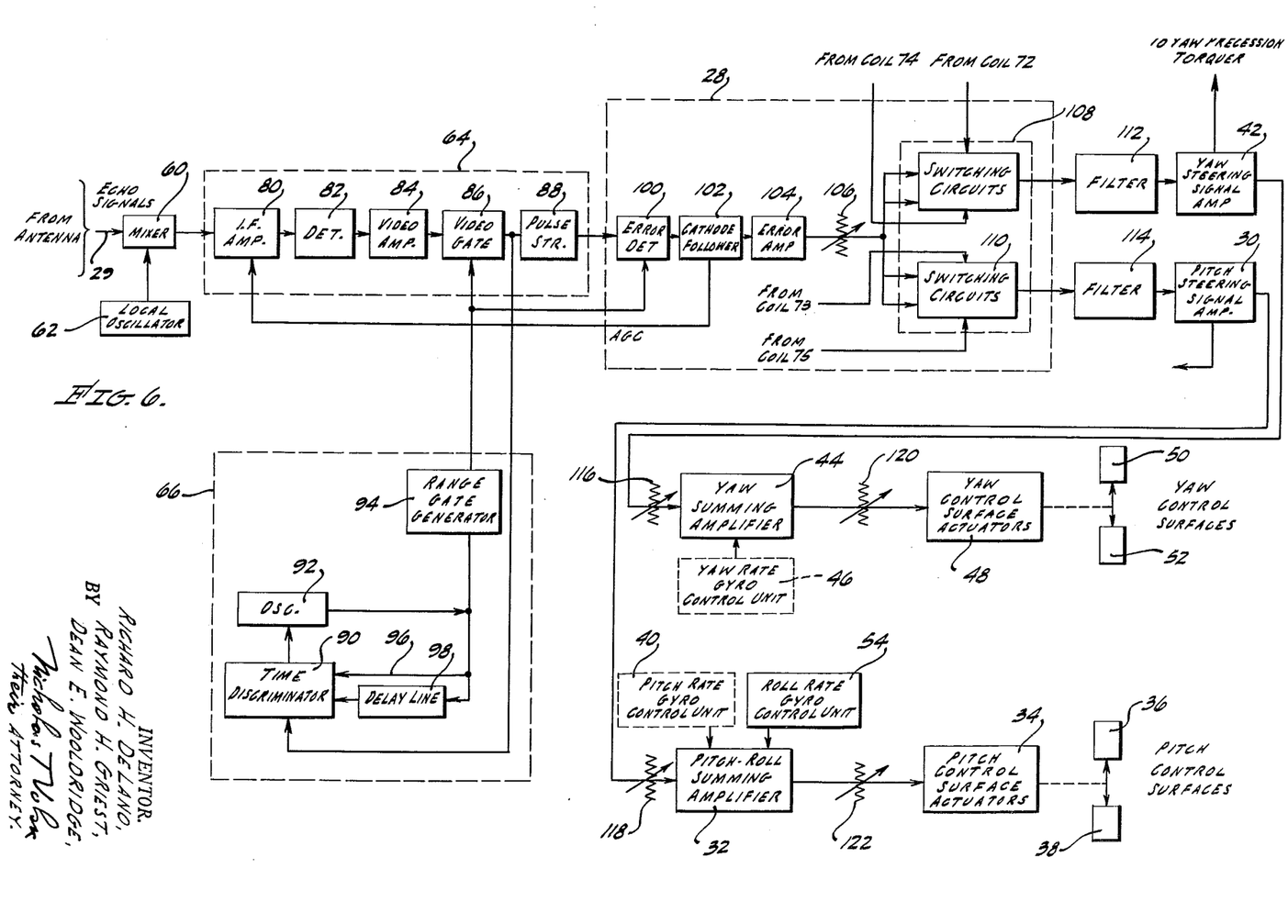
FIG. 6 is a block diagram showing the details of certain components of the guidance and control system of FIG. 1.

Referring now to FIG. 6, the $i - f$ channel 64 of the receiver 25 includes an $i - f$ amplifier section 80 upon the input circuit of which the output signal from the mixer 60 is impressed. The $i - f$ amplifier 80 is coupled to a detector circuit 82. A video amplifier 84 for amplifying the high-frequency or video signal obtained from the antenna, and which is connected with a video gate stage 86, is coupled to the detector 82. A portion of the output of the video gate 86 is impressed upon a time discriminator 90 forming part of the target tracking network 66.

In the target-tracking network 66, there is provided an oscillator 92 having its output circuit coupled to both a range gate generator 94 and the time discriminator 90. The portion of the output of the oscillator 92 that is coupled to the time discriminator 90 is provided with two gate paths, a direct connection 96 and a path through a delay line 98, thereby to provide an "early" gate and a "late" gate. The output of the time discriminator 90 is coupled to the oscillator 92 for controlling the frequency of the output wave of such oscillator.

The operation of the circuit above described in connection with FIG. 6 is as follows:

The $i - f$ signal derived from the output of the mixer 60 is amplified in the $i - f$ amplifier section 80, which may include a number of wide-band amplifiers connected in a well known manner to provide a desired gain. The amplified $i - f$ signal is impressed upon the detector 82, where it is converted into a video signal. The video signal is then amplified by the amplifier 84 and fed to the video gate 86.

In order to insure the operation of the system in response to echo signal pulses returned from the selected target, despite the presence of extraneous or noise signals, the oscillator 92 generates signal gate pulses in synchronism with the arrival of the echo pulses for controlling the operation of the system. In order to achieve this and continually throughout the flight of the missile, it is desirable that the echo pulses have a substantially constant repetition rate. Accordingly, prior to launching of the missile, the frequency of the oscillator 92 may be set so that the signal gate pulses generated thereby are synchronized with the received echoes of signals that are transmitted at a constant repetition rate by the target-illuminating radar antenna. In this manner, the signal gate pulses generated by the oscillator 92 effect the operation of the range gate generator 94, and consequent operation of the system, with the arrival of the video pulses at the input of the video gate.

Gating circuit arrangements for gating or switching radar receivers coincidentally with the arrival of echo pulses returned from a selected target are well known. Gating circuits of this type are described in the M.I.T. Radiation Laboratory Series, Vol. 20, "Electronic Time Measurements", Ch. 4, "Generation of Fixed Indices", McGraw-Hill Book Co., Inc., 1949. The particular arrangement above described, in connection with FIG. 6, however, provides a self-sufficient target-tracking network, dependent only upon echo signal pulses having a constant repetition rate.

Throughout the flight of the missile, the sensitivity of the system to the echo signals must be a maximum. It is well known that in gating circuits of the type above described, the position of a video pulse representative of a received echo signal relative to a signal gate pulse developed by the oscillator 92 may shift, and that the sensitivity of the gated receiving system is reduced to an extent depending upon the amount of such shift. This means that an accurate timing circuit must be provided for maintaining the receiver sensitivity a maximum to echo signal reception at all times throughout the flight of the missile, that is, the locally developed signal gate pulses must be maintained in exact time relation with respect to the received video pulses at all times. The role of the time discriminator 90 and the early and late gates 96, 98 is to change the frequency of the oscillator 92 to the extent required so that the proper relation between the signal gate pulses and the video pulses is maintained. An understanding of the effect of the time discriminator 90 and the early and late gates 96, 98 described here may be obtained from the above-mentioned publication, with reference to FIG. 4 – 28, page 99, wherein a video pulse is shown in a desired central position with respect to the end of an early gate pulse and the beginning of a late gate pulse, and also with reference to Chapter 3 of the above-mentioned publication "Techniques of Pulse Time Measurements", pages 37–68.

Coincidentally with a shift from the desired relative positions of the video pulses with respect to the early and late gate pulses applied to the discriminator 90, the output of the discriminator varies in accordance with the degree of such shift to change the frequency of the oscillator 92 the necessary amount to cause the signal gate pulses to shift the precise amount for re-establishing the desired relative positions above mentioned. In this manner, the video gate 86 is controlled so that the sensitivity of the system to the echo signals returned from the selected target will be maintained at a maximum throughout the flight of the missile.

The self-synchronizing target tracking network 66, as previously mentioned, requires only that the echoes returned from the target have a substantially constant repetition rate; synchronization in the prior art has been achieved by means of external signals received directly from the target-illuminating source along with echo signals returned from the target.

Video pulses obtained from the output of the video gate 86 may be applied directly to an arrow detector 100 forming part of the error detecting channel 28 to be detected and converted into usable information. Alternatively, if the video pulses are too far apart to permit a smooth output from the detector 100, a suitable pulse distortion circuit, such as the type known in the art as a pulse stretcher 88, may be coupled to the output of the video gate 86 for delivering a suitable signal input to the error detector 100 to obtain the desired output therefrom. The error detector 100 delivers an error signal, which may be termed the scan frequency component of the echo signals, to the input circuit of a cathode follower 102, the output signal of which is impressed upon an error amplifier 104. The amplified output of the error amplifier 104 is then impressed upon an error phase detector network comprising two pairs of electronic switching circuits 108 and 110.

Automatic gain control (AGC) of the amplifiers in the IF amplifier section 80 may be provided in a conventional manner through an AGC line coupled between the cathode follower 102 and the amplifiers in the IF amplifier section 80.

Coupled between the output circuit of the error signal amplifier 104 and the input circuit of the switching circuits 108, 110 is an attenuator 106, which may be a ladder-resistor attenuator, suitably designed to limit the gain of the error signal amplifier 104 in accordance with the conditions of flight of the missile. The attenuator 106 is preferably adapted to be set as required prior to launching of the missile and to maintain such setting throughout the flight of the missile.

Preferably the switching circuits 108 and 110 are of the bi-directional type, a form of which is described in the technical paper, "High Performance Demodulators for Servomechanisms", Proc. NEC, 1946, pages 393–403, Rogers Printing Company, Chicago, Ill. Two pairs of such electronic switching circuits 108 and 110 may be employed with the input circuits of each switching circuit being coupled to the output of the error signal amplifier 104 through the attenuator 106.

The oppositely disposed pairs of reference or "pip" voltage coils 72, 74, and 73, 75 are coupled to the respective pairs of electronic switches 108, 110 for controlling the operation of respective switches of each pair. It should be clear from the above-mentioned technical report that each switching circuit of the respective pairs 108, 110 may be so biased that conduction thereof will occur only upon the occurrence of induced voltages in the respective coils 72, 74 and 73, 75.

With the oppositely disposed pairs of coils 72, 74 and 73, 75 connected in the manner above described, the output from each pair of switching circuits 108, 110 depends upon the relative magnitudes of the input error signal as "seen" by the respective switching circuits during their operation. This may be further explained with reference to FIGS. 7–10:

It is well known that with a conically scanning antenna system of the type here employed, the scan frequency component of the echo signals, that is, the error signal derived from the amplitude-modulated echo signals returned from a target that is displaced from the antenna scan axis or line-of-sight, is substantially a sine wave; this is due to the field intensity pattern of the antenna system employed for conical scanning. The peak-to-peak value of this sine wave varies with the degree of displacement of the target from the line-of-sight, but its period of frequency is always the same. However, with respect to each of the oppositely disposed pairs of pip coils, 72, 74 and 73, 75, and, therefore, with respect to the corresponding reference voltage pulses or pip voltages induced therein, error signals resulting from equal displacements of a target in different directions about the line-of-sight, though being of equal peak-to-peak values, have different values, that is, the sine wave for one position of target displacement with respect to the line-of-sight differs in phase from the sine wave for an equal target displacement in a different direction about the line-of-sight.

FIGS. 7–10 show the relative positions of the scan frequency component of error signals with respect to the reference voltage pulses 72', 73', 74', 75' generated by the respective coils 72, 73, 74, 75 for four different positions of a target displaced from the line-of-sight within the field of scan of the antenna system. By virtue of the arrangement of the coils as described in connection with FIG. 5, trains of the reference pulses 72', 73', 74', 75' occur at 90° intervals throughout each scanning cycle of the antenna reflector 20.

Figure 7:
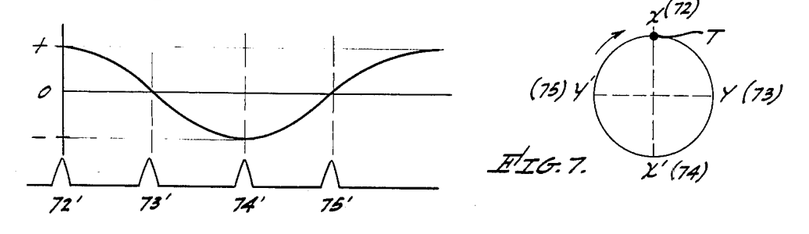
FIGS. 7–10 are characteristic curves illustrating the comparisons between echo signals and reference signals in the guidance and control system of FIG. 1 for deriving the necessary control signals to steer the missile.

At the right of FIG. 7, there is shown a projection of the field of scan, wherein the direction of scanning is depicted by an arrow as being clockwise. For the purposes of illustration, oppositely disposed, vertically aligned points X—X' and horizontally aligned points Y—Y' represent respective positions of the four pip-voltage coils 72, 74, and 73, 75 are obtained. If a target T is located at the upper vertical point X then the maximum positive error signal will occur coincidentally with the generation of the reference pulse 72' in the coil 72, and the maximum negative signal of such sine wave will occur at the time the reference pulse 74' is induced in the oppositely disposed coil 74, that is, 180° later in the cycle.

In the above illustration, the horizontally aligned pip coils 73, 75 occupy positions with respect to the projected field of scan which are equidistant from the target T; hence, the respective reference pulses 73', 75' generated in these coils occur at points in the scanning cycle which are respectively 90° and 270° later than the first-mentioned reference pulse 72', where the amplitudes of the error signal are equal and zero.

By virtue of the variation in amplitude of the scan frequency component of the error signal above described about a zero or reference line, which is the situation upon application thereof to the input of the pairs of switching circuits 108, 110, positive and negative voltages varying sinusoidally are available for application to the individual switching circuits. However, since the pairs of switching circuits 108, 110 of the error phase detector network are rendered selectively operative under the control of the reference pulses 72', 74' and 73', 75' generated in the respective coils 72, 74 and 73, 75 the output signals from each pair of switching circuits will depend upon the relative magnitudes of the voltages available when the controlling reference pulses are generated. It can be seen from FIG. 7 that maximum positive and maximum negative voltages are available, respectively, upon the generation of the reference pulses 72', 74' in the respective vertically aligned coils 72, 74 for operation of one pair of switches 108, whereas during the application of the reference pulses 73', 75' generated in the horizontally aligned coils 73, 75 no voltage differential exists. Therefore, the output of the switching circuits 108 controlled by the maximum voltage differential is a maximum voltage of one polarity, and the output of the remaining pair of switching circuits 110 is zero.

Figure 8:
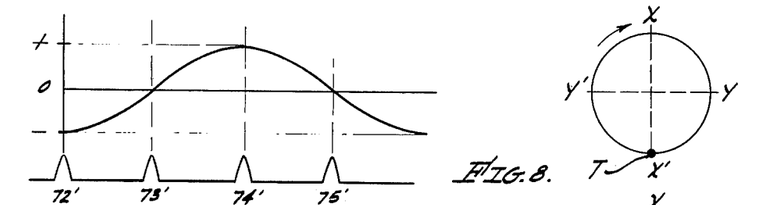

FIG. 8 illustrates the condition where the target T is displaced from the line-of-sight by the same amount as in FIG. 7, but in the opposite direction. This means that the voltage differential obtained from the output of the switching circuits 108 controlled by the vertically aligned coils 72, 74 will be the same as in the situation illustrated in FIG. 7, but of opposite polarity, and the output voltage derived from the other switching circuits 110 will still be zero.

Figure 9:
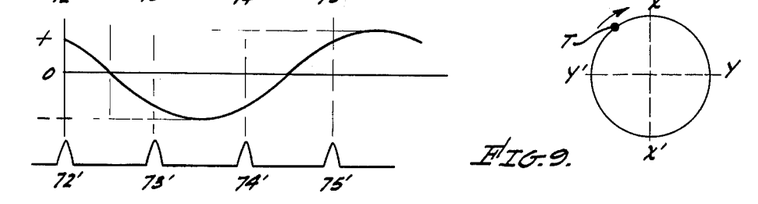

FIG. 9 illustrates a situation where the target T is located at a point 45° behind the position of the target in FIG. 7, but at the same displacement from the line-of-sight. Under such circumstances, the magnitude of the error signal at the occurrence of the reference pulse 72' generated in the upper vertical coil 72 is somewhat less than the maximum; in fact, it lags the maximum by 45°. In other words, the error signal for the situation illustrated in FIG. 9 lags the error signal illustrated in FIG. 7 by 45°. Accordingly, the voltages which the pair of switching circuits 180 "sees" upon being rendered operative by the reference pulses 72', 74', will have a differential that differs from the maximum by virtue of the 45° phase difference, and the output from the switching circuits 108, although of the same polarity as in the situation illustrated in FIG. 7, will have a voltage differential corresponding to the amplitudes of the error signal of FIG. 7 at the 45° and 225° points.

As is clearly indicated in FIG. 9, the voltage applied to the pair of switching circuits 110 aligned with the horizontally disposed coils 73, 75 will be negative and positive, respectively, upon the occurrence of the respective controlling reference pulses 73', 75'. It should be observed further that the voltage differential in the output of this pair of switching circuits 110 has the same amplitude as that delivered by the other pair of switching circuits 108, but opposite polarity; therefore, the output signals from the respective pairs of switches will be equal in magnitude and opposite in polarity.

Figure 10:
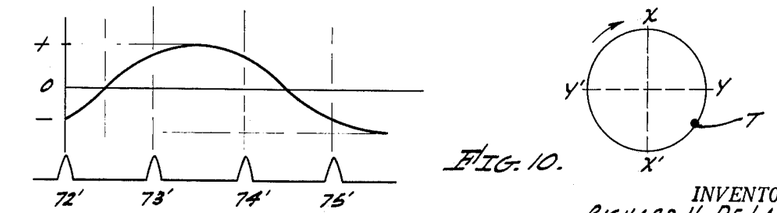

FIG. 10 illustrates a situation where the target T is 180° displaced from the position of the target in FIG. 9. Obviously, the voltages obtained from the outputs of the respective pairs of switching circuits 108, 110 will be the same in magnitude as in the situation illustrated in FIG. 9, but the polarities of such output voltages will be opposite to those of the output voltages provided in the situation shown in FIG. 9.

Referring again to FIGS. 4 and 6, the output voltages from the pair of switching circuits 108 that are controlled by reference voltages 72', 74' generated in the vertically aligned coils 72, 74 are employed to control the operation of the yaw control surfaces 50, 52 and, similarly, the output voltages from the other pair of switching circuits 110 are utilized to effect the operation of the pitch control surfaces 36, 38. If the yaw control surfaces 50, 52 are substantially aligned with the vertically aligned coils 72, 74, the output voltages from the associated pair of switching circuits 108 will be representative of the amount of deflection required of the yaw control surfaces 50, 52 to steer the missile horizontally and thereby reduce the yaw error thereof with respect to the proportional navigation course it must pursue. Similarly, with the pitch control surfaces 36, 38 aligned with the horizontally aligned coils 73, 75, the output voltages from the associated pair of switching circuits 110 determine the deflection of the pitch control surfaces 36, 38 necessary to correct for horizontal deviation of the missile from the proportional navigation course.

Simultaneously, the output voltages from the respective pairs of switching circuits 108, 110 associated with the yaw control surfaces 50, 52 and pitch control surfaces 36, 38 are directed to the yaw precession torquer 26 and the pitch precession torquer 24, respectively, because these output voltages are representative of the deviation of the target from the line-of-sight. Hence, their application to the precession torquers 24, 26 effects the appropriate operation thereof to cause yaw and pitch movements of the antenna reflector 20 and antenna 22 necessary to correct for the displacement of the target with respect to the line-of-sight for the purposes of centering or lining up the target on the line-of-sight, i.e., on the antenna spin axis.

The four situations shown in FIGS. 7–10 and described in connection therewith are illustrative only. However, it is believed that the discussions of these situations are sufficient for a clear understanding of the operation of the system to effect corrective action (a) by the precession torquers 24, 26 for maintaining the target substantially on the line-of-sight and (b) by the yaw and pitch control surfaces 50, 52 and 36, 38 for maintaining the missile on a predetermined proportional navigation course, in response to echo signals returned from a target having any degree of displacement from or about the line-of-sight.

From the aforegoing dicussions, wherein the alignment of the oppositely disposed pairs of coils 72, 74 and 73, 75 with the yaw and pitch control surfaces 50, 52 and 36, 38 was pointed out, the correlation of the rotational axis of the reflector 20 to the missile coordinate axes as represented by the aligned control surfaces 50, 52 and 36, 38 is obvious. If the scan frequency components of the error signals in FIGS. 7–10 are considered for a different position of the coordinate axes of the missile than is illustrated, as, for example, for a position of the pip coils 45° ahead of that illustrated, it is obvious that the amplitudes corresponding to the instants when reference signals occur will be the amplitudes that are observed 45° ahead of each reference pulse in FIGS. 7–10. The respective pairs of control surfaces, being aligned with the pip coils as above explained, will receive the steering voltages necessary to properly alter the flight of the missile to maintain the missile on the proportional navigation course with the target. Furthermore, it can be seen that during rolling of the missile, the pairs of control surfaces will change their roles, being yaw control surfaces during a portion of the roll and pitch control surfaces during another portion of the roll.

Although the illustration of FIG. 7–10 are representative of situations wherein the target is always displaced the same distance from the line-of-sight, and thus the arrow signals shown are of equal magnitude, it should be obvious that for various degrees of displacement of a target with respect to the line-of-sight, proper correction voltages will always be "seen" by the error phase detector switching circuits 108, 110 so that the output voltages therefrom will be of the proper magnitude and polarity to effect the corrective actions above mentioned.

The outputs of the pairs of switching circuits 108, 110 are coupled to the respective steering signal amplifiers 42, 30 through respective filter networks 112, 114 suitably designed for preventing excessive noise from affecting the output of the steering signal amplifiers 42, 30 and thus further insuring the proper operation of the associated yaw and pitch control surface actuators 48, 34 and control surfaces 50, 52 and 36, 38. The output circuits of the steering signal amplifiers 42, 30 are coupled, respectively, to the precession torquer 26, 24 and the summing amplifier 44, 32 in the manner explained in connection with FIG. 1.

Further provisions, in addition to the attenuator 106, for adjusting the overall gain of the system are made by the employment of respective pairs of attenuators 116, 118 and 120, 122 located, respectively, between the associated steering signal amplifiers 42, 30 and summing amplifiers 44, 32 and between the associated summing amplifiers 44, 32 and control surface actuators 48, 34 as shown in FIG. 6. These attenuators 116, 118, 120, 122 like the previously described attenuator 106, may be of any well known type, as, for instance, ladder networks of resistors, suitable to accomplish the desired result. The attenuators above described are employed to determine the overall gain of the system in accordance with the operation required of the control surfaces for a particular flight of the missile. The attenuators should of course be capable of adjustment for operation over a sufficiently wide range so that the overall system may perform its various functions under a wide variety of tactical conditions for which it is to be used.

Referring to FIG. 6, it should be noted that it is possible to apply the steering signals derived from the output of the steering signal amplifiers 30, 42 to the respecitve summing amplifiers 32, 44 through the precession torquers 24, 26 in the manner described in connection with FIG. 1.

Thus far, the guidance and control system of this invention has been described for use in steering a missile in response to echoes from a target that has been illuminated by electromagnetic signals. Such systems have a number of advantages for obtaining accurate steering of guided missiles, such as the ability of the system to operate through fog and clouds without any significant loss in the amplitudes of the received echoes. This important advantage, however, is obtained at some sacrifice of simplicity because of the necessity for use of an antenna, local oscillator and mixer, intermediate frequency amplifier section, and target tracking network arranged as previously described. Furthermore, it is absolutely necessary that the target be illuminated by the radar transmitter throughout the flight of the missile; therefore, where the missile is launched from a mother aircraft, such launching aircraft is exposed throughout the flight of the missile to retaliatory measures or counter-blasts from the target itself. Such disadvantages are not present in the system which operates in response to infrared radiations produced by the target, as will now be explained.

The disclosed guidance and control system can be adapted very readily for steering a missile in response to radiant energy, such as infrared radiations, produced by the target itself. In this case, no external transmitter is required, and it is essential only that the missile be launched in a predetermined direction with respect to the target. Such predetermined launching or heading of the missile with respect to the target is also true where the present system operates in response to echo signals returned from the target. However, in this case, the mother aircraft, immediately after launching a missile, is free to undertake evasive action and leave the immediate scene before retaliatory measures of the type above mentioned can be effected. Furthermore, the circuit components of the infrared receiver are fewer in number and much less complex than the components of the receiver of the previously-described embodiment of the system. An adaptation of the present system for the above type of operation is illustrated in FIG. 14.

Figure 11:
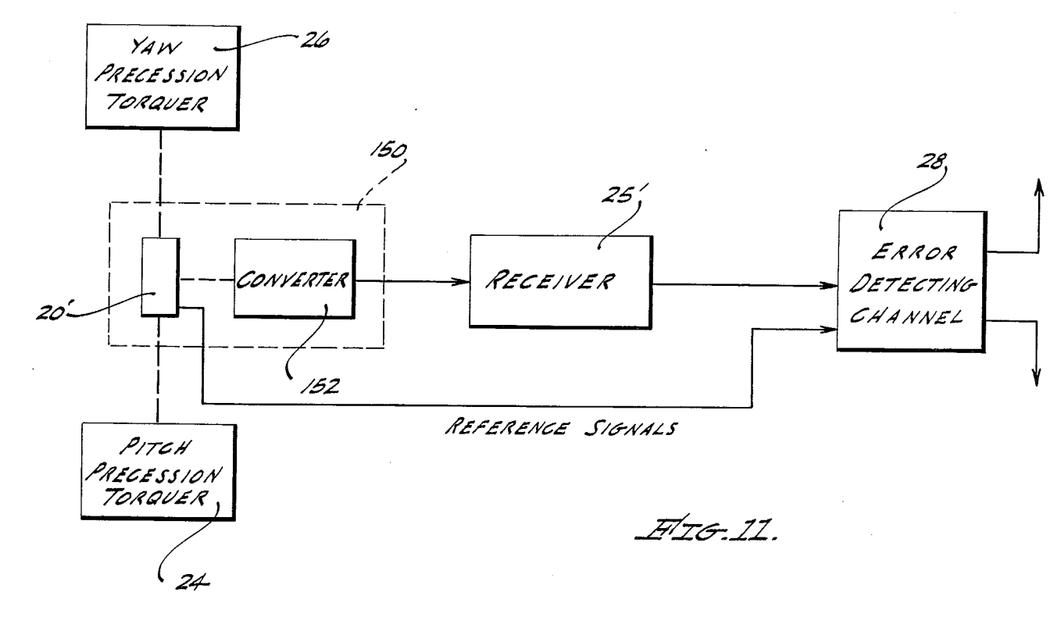
FIG. 11 is a block diagram of a portion of the system shown in FIG. 1 to illustrate the use of the present system for steering a missile in response to infrared radiations produced by a target, also in accordance with this invention.

Referring now to FIG. 11, an electro-optical unit 150 of a type suitable for receiving infrared radiations from a selected target employs a rotating or scanning optical system 20', which corresponds to the antenna reflector 20 of FIGS. 1, 4, and 5, and which is adapted for scanning a region in which there is located a selected target that produces infrared radiations. A suitable converter unit 152 for deriving electrical signals from the received infrared radiations is coupled to the scanning optical system 20'. Such converter unit 152 may, for example, comprise an interrupter or "chopper" mechanism upon which the infrared radiation from the optical system 20' are focused and which break up such radiations into pulses of radiant energy, and a suitable photoelectric device to which the radiant energy pulses may be applied for developing electrical signal pulses therefrom. Any suitable optical system and means for converting the radiation into pulses to derive electric signal pulses therefrom may be employed for the electro-optical unit 150. One electro-optical unit suitable for the system of the invention is described and claimed in a copending application of S. Hanson, entitled "Astronomical Means and Methods", Ser. No. 58,657, filed Nov. 6, 1948; and S. Hanson, entitled "Electro-optical Astronomical System", Ser. No. 188,401, filed Oct. 4, 1950, now U.S. Pat. No. 3,165,632, and assigned to the same assignee as is the present application.

Signal pulses from the electro-optical unit 150, which may be either frequency or amplitude-modulated by an amount representative of the position of the target with respect to the axis of the scanning optical system 20', may be applied to a suitable receiver 25' for deriving error signals therefrom. The receiver 25' in this case, of course, requires no intermediate-frequency amplifier section, nor is a self-synchronizing network therefor necessary. It is only necessary that suitable amplifier and detector circuits be employed in the receiver 25' for developing an error signal from, or a scan frequency component of, the signal pulses applied thereto.

The scanning optical system 20' is employed to generate reference signal pulses in the same manner as does the antenna reflector 20 above described. The reference signal pulses generated by the scanning optical system 20' and the error signals developed in the receiver 25' are applied to the error-detecting channel 28 and utilized to effect alignment of the target on the scan axis of the optical system 20' and steering of the missile in the manner previously described in connection with FIGS. 1 through 10.

What is claimed is:

1. In a target-seeking device having a plurality of steering elements, a guidance and control system for steering said device in accordance with a predetermined navigation system with respect to a target that is illuminated by high frequency radio signals, said system comprising, in combination, means for intercepting echo signals from said target; gyroscopic means coupled to said signal intercepting means, said gyroscopic means being adapted for scanning a region wherein said target is located and for impressing echo signals from said target upon said signal intercepting means; means coupled to said signal intercepting means for receiving said echo signals; said gyroscopic means being adapted to directly generate generating reference signals; means coupled to said receiving means and to said gyroscopic means and operable in response to said reference signals to develop steering signals representative of the position of said target within the scanned region; and means coupled to said steering signal developing means and to said gyroscopic means and operable in response to said steering signals to operate said steering elements to steer said device in accordance with said predetermined navigation system and to effect continuous tracking of said target by said gyroscopic means and said signal intercepting means.

2. A guidance and control system as defined in claim 1, in which said gyroscopic means comprises a conically scanning antenna reflector, said signal intercepting means comprises an antenna element located on the spin axis of said antenna reflector, and in which said antenna reflector forms the rotor of a free gyroscope.

3. A guidance and control system as defined in claim 2, in which said receiving means includes a video detector circuit for deriving video signals from said echo signals, and a synchronizing network for controlling the operation of said receiving means, said synchronizing network including a range gate generator coupled to said video detector circuit, an oscillator coupled to said range gate generator for generating gating signal pulses in synchronism with the video signals derived from said video detector circuit, and circuit means coupled between said video detector circuit and said oscillator for adjusting the frequency of said oscillator to maintain a predetermined relationship between said gating signal pulses and said video signals upon a variation in phase of said video signals due to changes in distance between said target and said device.

4. In a target-seeking device having a plurality of steering members, a guidance and control system for steering said device solely in response to echo signal pulses returned from a selected target at a substantially constant repitition rate, said system comprising, in combination, an antenna reflector forming the rotor of a free gyro, an antenna provided on the spin axis of said reflector for receiving circularly polarized waves said reflector being adapted to conically scan an area wherein said target is located, a receiving network coupled to said antenna for receiving said echo signal pulses and deriving a scan frequency component therefrom, means included in said receiving network for gating said receiving network in synchronism with the arrival of said echo signals pulses, a detector network coupled to said receiving network for receiving said scan frequency component, said reflector being a generator of a plurality of repetitive reference signal pulses each having a repetition rate equal to the scanning frequency of said reflector, means for applying said reference signal pulses to said detector network for selectively controlling the operation of said detector network, whereby said detector network develops steering voltages representative of the degree of displacement of said target from said spin axis, means coupling said detector network to said reflector for affecting movement of said reflector to cause said spin axis to be aligned with said target, and means coupling said detector network to said steering members to operate said steering members in accordance with said steering signals in a predetermined manner.

5. In a target-seeking device having a plurality of steering members for steering it along a predetermined type of navigation course with respect to a target that is illuminated by radio-frequency signals having a substantially constant repetition rate, a guidance and control system operable solely in response to echoes of said signals reflected from said target for effecting the steering of said device along said predetermined course, said system comprising, in combination, gyroscope scanning means for conically scanning an area wherein said target is located; means coupled to said scanning means for receiving said signals, means for operating said receiving means in synchronism with the received echo signals, said scanning means being a generator of reference signals; means selectively operable by said reference signals and coupled to said receiving means to produce error signals representative of the deviation of said target from the center of the field of scan; and means selectively operable in response to said error signals and coupled to said scanning means and to said steering members to effect continuous tracking of said target by said scanning means and to operate said steering elements for steering said device along said predetermined course.

6. In a target-seeking device having a plurality of steering elements, a guidance and control system for steering said device in accordance with a predetermined navigation system with respect to a selected target from which radiant energy may be received, said system comprising, in combination, means for intercepting radiant energy from said target; means for scanning a region wherein said target is located and for impressing radiant energy from said target upon said intercepting means; said scanning means including a gyroscope, said gyroscope being adapted to generate reference signals; receiving means coupled to said intercepting means; said intercepting means being operable upon said radiant energy being impressed thereon to apply signal pulses to said receiving means; means coupled to said receiving means and operable in response to said reference signals to develop steering signals representative of the position of said target within the scanned region; and means coupled to said steering signal developing means and to said scanning means and operable in response to said steering signals too perate said steering elements to steer said device in accordance with said predetermined navigation system and to effect continuous tracking of said target by said scanning means and said signal intercepting means.

7. The guidance and control system defined in claim 6, in which said scanning means comprises an optical system which forms the rotor of a free gyroscope and which optically scans the region in which the target is located, said intercepting means is operative to periodically interrupt the radiations impressed thereon by said optical system, and photoelectric means for receiving the interrupted radiations from said intercepting means and developing electric signal pulses therefrom for application to said receiving means.

8. The guidance and control system defined in claim 6, in which said scanning means is an optical device for optically scanning said region and receiving infrared radiations from the target, said intercepting means comprises an electro-optical converter operable to develop electric signal pulses from the received infrared radiations and impressing said electric signal pulses upon said receiving means, said optical device being utilized to develop reference signal pulses of the scanning frequency thereof, and said steering signal developing means comprising a phase detector network coupled to said receiving means and operable upon the occurrence of said reference signal pulses to develop steering signals representative of the position of the target within the scanned region.

9. In a target-seeking device having steering members, a guidance and control system for steering said device along a predetermined course with respect to a target in response to echoes of radiant energy pulses which illuminate said target, said system comprising, in combination, a gyro rotor antenna reflector for conically scanning an area in which said target is located and collecting said echo pulses returned from said target; means for precessing said gyro rotor reflector; an antenna, located on the spin axis of said gyro rotor reflector, upon which said collected echo signal pulses are focused; receiving means; means coupling said antenna and said receiving means for applying the collected echo pulses to said receiving means; means coupled to said receiving means for comparing selected portions of said echo pulses; said gyro rotor reflector including means to generate reference signals representative of the position of said reflector; means coupled to said comprising means and to said reflector for controlling the operation of said comparing means in accordance with said reference signals, whereby said comparing means develops steering signals effective to move said steering members for steering said device along said predetermined course and to operate said precessing means for precessing said gyro rotor reflector to maintain said target within the area of scan; and means for applying said steering signals to said precessing means and to said steering members.

10. In a target-seeking device having at least two pairs of steering members adapted to be deflected for steering said device, a guidance and control system, operable in response only to echo signal pulses from a target that has been illuminated by radiant energy pulses of a predetermined repetition rate, for operating said deflectable members to steer said device along a predetermined course with respect to said target, said system comprising, in combination, an antenna reflector constituting the rotor of a free gyroscope for conically scanning an area in which the target is located, means for precessing said reflector, an antenna located on the spin axis of said reflector for intercepting the echo signal pulses received by said reflector from said target, said echo signal pulses being amplitude-modulated by virtue of the field intensity pattern of said antenna, detector means coupled to said antenna for obtaining a scan frequency component of said echo signals, amplifying means coupled to said detector means, a self-synchronizing network coupled to said amplifying means for gating the output of said amplifying means, an error phase detector network coupled to said amplifying means, said antenna reflector including means to generate reference signals, means for applying said reference signals to said error phase detector network for selectively operating said error phase detector network to compare the amplitudes of portions of the scan frequency component of said echo signals selected in accordance with said reference signals, and to develop steering signals representative of the deviation of said target from said spin axis, first circuit means coupling said error phase detector network to said precessing means and to one pair of said steering members, and second circuit means coupling said error phase detector network to said precessing means and to the other pair of said steering members, whereby said reflector and said steering members will be operated in accordance with said steering signals.

* * * * *